United States Patent
Toth et al.

(10) Patent No.: US 7,321,021 B2
(45) Date of Patent: Jan. 22, 2008

(54) REMOVING IMPURITIES FROM POLYTHIOPHENE

(75) Inventors: Alan Edward John Toth, Burlington (CA); Tamara Perez-Cruz, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 478 days.

(21) Appl. No.: 11/085,215

(22) Filed: Mar. 22, 2005

(65) Prior Publication Data

US 2006/0217524 A1    Sep. 28, 2006

(51) Int. Cl.
*C08G 75/00* (2006.01)

(52) U.S. Cl. .................... 528/378; 528/373; 528/491; 528/499; 528/502 R

(58) Field of Classification Search ............... 528/378, 528/373, 491, 499, 502 R
See application file for complete search history.

(56) References Cited

U.S. PATENT DOCUMENTS

| | | |
|---|---|---|
| 6,621,099 B2 | 9/2003 | Ong et al. |
| 6,770,904 B2 | 8/2004 | Ong et al. |
| 2003/0160234 A1 | 8/2003 | Ong et al. |
| 2004/0186265 A1 | 9/2004 | Liu et al. |
| 2004/0227128 A1 | 11/2004 | Reuter et al. |
| 2005/0017311 A1 | 1/2005 | Ong et al. |

OTHER PUBLICATIONS

Z. Bao et al., "Soluble and Processable Regioregular poly(3-hexylthiophene) for Thin Film Field-Effect Transistor Application With High Mobility," *Appl. Phys. Lett.*, vol. 69, No. 26, pp. 4108-4110, 1996.
R. McCollough, "The Chemistry of Conducting Polythiophenes," *Advanced Materials*, vol. 10, No. 2, pp. 93-116, 1998.
K. Yoshino et al., "Preparation and Properties of Conducting Heterocyclic Polymer Films by Chemical Method," *Japanese Journal of Applied Physics*, vol. 23, No. 12, pp. L899-L900, 1984.
R. Sugimoto et al., "Preparation of Soluble Polythiophene Derivatives Utilizing Transition Metal Halides as Catalysts and Their Property," *Chemistry Express*, vol. 1, No. 11, pp. 635-638 (1986).
M. Leclerc et al., "Structural Analysis of poly(3-alkylthiophene)s," *Makromol. Chem.*, vol. 190, pp. 3105-3116, 1989.
V. Niemi et al., "Polymerization of 3-alkylthiophenes with FeCi₃," *Polymer Reports*, vol. 33, No. 7, pp. 1559-1562, 1992.
K. Kowalik et al., "Electrically Conducting Poly(undecylbithiophene)s. 1. Regioselective Synthesis and Primary Structure," *Macromolecules*, vol. 34, pp. 5471-5479, 2001.

*Primary Examiner*—Duc Truong
(74) *Attorney, Agent, or Firm*—Oliff & Berridge PLC

(57) ABSTRACT

Impurities are removed from polythiophene by mixing a composition comprising polythiophene, water and an organic liquid at a temperature at which the organic liquid dissolves the polythiophene; allowing an aqueous phase to separate from an organic phase and recovering organic phase; adding water to recovered organic phase and mixing the resulting composition at a temperature at which the organic liquid dissolves the polythiophene; allowing an aqueous phase to separate from an organic phase and recovering organic phase; and allowing polythiophene solid to precipitate from recovered organic phase.

20 Claims, No Drawings

REMOVING IMPURITIES FROM POLYTHIOPHENE

BACKGROUND

This disclosure relates to preparing a polythiophene and/or removing impurities from a polythiophene.

A number of polythiophenes are known that may be useful as conductive or semiconductor materials in electronic device such as thin film transistors, photovoltaic cells, organic/polymer light emitting diodes, and the like. Particularly useful polythiophenes are those that are soluble in organic solvents, and can thus be processed into microelectronic components by solution processes, such as spin coating, solution casting, dip coating, screen printing, stamp printing, jet printing and the like, thereby lowering the manufacturing cost of microelectronic devices. Specifically, certain polythiophenes, which contain repeating 2,5-thienylene (also known as 2,5-thiophendiyl) units possessing long side-chains, such as alkyl, arranged in a regioregular manner on the polythiophene backbone, may be suitable for these applications. The long alkyl side-chains, while imparting enhanced solubility characteristics to the polythiophenes, may also help induce and facilitate molecular self-organization when they are positioned in a regioregular manner on the polymer backbones.

In a condensed phase, such as in thin films, molecular self-organization of polymer molecules under appropriate conditions permits ordered microstructure domains, and which molecules when present in the charge transport layers of microelectronic devices could enhance their electrical performance. For example, for the polythiophene semiconductor channel layers in thin film transistors, the presence of the lamellar $\pi$-stacking microstructures has been known to lead to superior field-effect transistor properties.

Thin film transistors, which utilize solution processable organic/polymer materials and polymer composites, may also be fabricated on plastic substrates to permit low cost lightweight structurally flexible integrated circuits that may be mechanically more robust and durable. These flexible lightweight integrated circuits are useful for incorporation into electronic devices, such as large-area image sensors, electronic paper and other display media where lightweight characteristics and device structural flexibility may be very appealing. These integrated circuit elements may also find use in low-end microelectronics, such as smart cards, radio frequency identification (RFID) tags, and memory/storage devices that require mechanical durability for extended life. For these applications, the performance of the polymer semiconductor materials, such as the polythiophenes in the channel layer, is of value. Also, while different synthetic methodologies and reaction conditions may provide analytically similar polythiophenes, the electrical performance of these polythiophenes, particularly their field-effect transistor characteristics when used as semiconductor channel materials in thin film transistor devices, may be dissimilar, for example there may be variations in the field-effect.

Certain polythiophenes have been reported for use as semiconductor materials in thin film field-effect transistors. One known example is a regioregular poly(3-alkylthiophene), see for example reference Z. Bao et al., "Soluble and processable regioregular poly(3-hexylthiophene) for field-effect thin film transistor application with high mobility," *Appl. Phys. Lett.*, Vol. 69, p4108 (1996), which is herein incorporated in its entirety by reference. The use of polymer semiconductors, such as polythiophenes, as the semiconductor channel layers has enabled the fabrication of flexible transistors on plastic substrates.

Polythiophenes can be prepared by many synthetic procedures depending specifically on the nature of the desired polythiophenes structures. A recent review of the chemistry and synthesis of polythiophenes was published by Richard D. McCullough, see reference R. D. McCullough, *Adv. Mater.*, Vol. 10, p. 93 (1988), which is herein incorporated in its entirety by reference. Of all the preparative procedures for soluble polythiophenes, such as poly(alkylthiophenes), one synthetic methodology is metal halide-mediated oxidative coupling polymerization, reported by R. Sugimoto, see K. Yoshino, S. Hayashi, R. Sugimoto, "Preparation and Properties of Conducting Heterocyclic Polymer Films by Chemical Method," *Jpn J. Appl. Phys.*, Vol. 23, p. L899 (1984), and R. Sugimoto, S. Takeda, H. B. Gu, and K. Yoshino, "Preparation of soluble Polythiophene derivatives utilizing transition metal halides as catalysts and their property," *Chem. Express*, Vol. 1, p. 635 (1986), each of which are herein incorporated in their entirety by reference. In this method, alkylthiophene is usually treated with ferric chloride ($FeCl_3$) in chloroform under a blanket of dry air, or with a slow stream of dry air or inert gas bubbling through the reaction medium to drive off the generated HCl for a period of from a few hours to days. A detailed study of this polymerization was also reported by Leclerc, see reference M. Leclerc, F. M. Diaz, G. Wegner, "Structural analysis of poly(3-alkylthiophene)s," *Makromol. Chem.*, Vol. 190, p. 3105 (1989), which is herein incorporated in its entirety by reference.

Polythiophenes prepared with chloroform and other reaction media, such as for example, toluene, carbon tetrachloride, pentane, hexane, and the like, are illustrated in, for example, V. M. Niemi, P. Knuuttila, J.-E. Osterholm, and J. Korvola, "Polymerization of 3-Alkylthiophens with $FeCl_3$," *Polymer*, Vol. 33, p. 1559 (1992) and J. Kowalik, L. M. Tolbert, S. Narayan, and A. S. Abhiraman, "Electrically Conducting Poly(undecylbithiophene)s. 1. Regioselective Synthesis and Primary Structure," *Macromolecules*, Vol. 34, p. 5471 (2001), which are herein incorporated in their entirety by reference.

Patent Publication No. US 2004/0186265 A1 to Liu et al., which is herein incorporated by reference in its entirety, describes an electronic device containing a polythiophene prepared by a metal halide-mediated coupling polymerization in an appropriate solvent, specifically by a $FeCl_3$-mediated polymerization in a halogenated aromatic solvent, such as chlorobenzene or dichlorobenzene. This patent publication discloses that, after the reaction, the reaction mixture can be washed sequentially with water and a dilute aqueous ammonium hydroxide solution, followed by washing with water, and then isolating the polythiophene product through precipitation by pouring the dilute solution into an appropriate nonsolvent such as methanol or acetone. The polythiophene product is then subjected to soxhlet extraction with appropriate solvents such as methanol, hexane, heptane, toluene, xylene, tetrahydrofuran, chlorobenzene, and the like. The polythiophene thus obtained can be further purified by precipitation from a suitable nonsolvent such as methanol or acetone.

SUMMARY

Soxhlet extraction is a time-consuming process that may take a week or more. In addition, it does not always result in polymer with sufficient mobility. Furthermore, it cannot easily be conducted on a large scale. Thus, a method for purifying polythiophene that is shorter, more effective and can be conducted on larger scales is desired.

As used herein, the term "polythiophene" refers to a polymer containing thiophene monomers. Thiophene monomers include thiophene itself and substituted thiophene, such as an alkyl substituted thiophene. In embodiments, the substituted thiophenes are substituted with an alkyl or substituted alkyl having from 1 to 25 carbon atoms, preferably from 5 to 18 carbon atoms.

As discussed above, various processes for forming polythiophenes are known in the art. These processes generally result in crude polymer that may be purified before its use. The present disclosure describes a technique by which impurities may be removed from this crude polymer.

In embodiments, the present disclosure describes forming polythiophenes in the presence of a metal halide, specifically $FeCl_3$. However, the present disclosure is not limited to polythiophenes formed in the presence of $FeCl_3$ or another metal halide.

In embodiments, the method for removing impurities from polythiophene comprises mixing a composition comprising polythiophene, water and an organic liquid at a temperature at which the organic liquid dissolves the polythiophene. Thereafter, an aqueous phase of this composition is allowed to separate from an organic phase, and the organic phase is recovered. Water is then added to recovered organic phase and the resulting composition is mixed at a temperature at which the organic liquid dissolves the polythiophene. The newly added aqueous phase is then allowed to separate from the organic phase, and the organic phase is recovered. The steps of adding water, allowing separation and recovering the organic phase may be repeated one or more times. In one or more of these series of steps, the water may contain or be added together with another component. For example, the water can contain or be added together with an acid or a base. Thereafter, the polythiophene solid is allowed to precipitate from recovered organic phase. After allowing the polythiophene solid to precipitate, the polythiophene solid can be filtered from the organic liquid and dried.

In embodiments, the disclosure is directed to a method for preparing polythiophene. In this method, thiophene monomer and/or oligomer thereof is polymerized in an organic solvent in the presence of metal halide, particularly $FeCl_3$, to form polythiophene. The polythiophene is then mixed in a composition also comprising water and an organic liquid at a temperature at which the organic liquid dissolves the polythiophene. This composition is then processed as discussed in a previous paragraph.

In a particular embodiment, the disclosure describes a method comprising: (a) mixing a composition comprising polythiophene, water and an organic liquid at a temperature at which the organic liquid dissolves the polythiophene; (b) allowing an aqueous phase to separate from an organic phase and recovering the organic phase; (c) adding water to recovered organic phase and mixing the resulting composition at a temperature at which the organic liquid dissolves the polythiophene; (d) allowing an aqueous phase to separate from an organic phase and recovering the organic phase; (e) repeating steps (c) and (d) at least one time; (f) adding a basic aqueous solution to organic phase recovered in (e) and mixing the resulting composition at a temperature at which the organic liquid dissolves the polythiophene; (g) allowing an aqueous phase to separate from an organic phase and recovering the organic phase; (h) using the organic phase recovered in step (g), repeating steps (c) and (d) at least one time; and (i) allowing polythiophene solid to precipitate from organic phase recovered in (h).

DETAILED DESCRIPTION OF EMBODIMENTS

The polythiophenes that may synthesized and/or have impurities removed therefrom herein may be any polythiophene. In particular, the polythiophene may be a substituted polythiophene. In particular, the polythiophene may be substituted at the three or four positions of at least one of the thiophene monomers that make up the polymer.

Specifically, polythiophenes, which may be useful in microelectronic applications, contain one or a combination of repeating units selected from the group consisting of 2,5-thienylene (or 2,5-thiophenediyl) (I), 2,5-thienylene (or 2,5-thiophenediyl) (II), and a divalent linkage, D

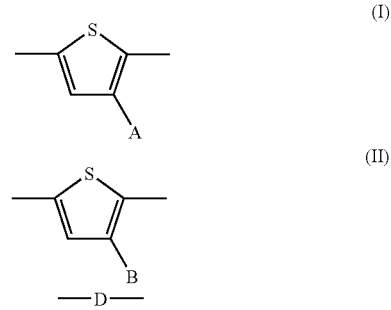

wherein, for example, A is a long side-chain comprising, for example, alkyl, alkyl derivatives, alkoxy, and the like, such as alkoxyalkyl, siloxyalkyl, perhaloalkyl, polyether, and the like; B is hydrogen atom or a substituent, such as for example, methyl, ethyl, methoxy, ethoxy, bromo, and the like; and D is selected, for example, from the group consisting of arylene with, for example, from about 6 to about 36 carbon atoms, such as phenylene, biphenylene, phenanthrenylene, dihydrophenanthrenylene, fluorenylene, oligoarylene, methylene, polymethylene, dialkylmethylene, dioxyalkylene, dioxyarylene, oligoethylene oxide, and the like.

The long side-chain, A, is preferably one that contains, for example, from about 5 to about 25 atoms, and the small substituent, B, contains from 1 to about 3 carbon atoms. Illustrative examples of A of the 2,5-thienylene moiety (I) include alkyl with, for example, from about 1 to about 25 carbon atoms, and more specifically, from about 5 to about 18 carbon atoms, such as pentyl, hexyl, heptyl, octyl, nonyl, decyl, undecyl, dodecyl, hexadecyl, octadecyl, isomeric forms thereof, mixtures thereof, and the like; alkoxy and alkoxyalkyl with, for example, from about 5 to about 25 carbon atoms, such as for example pentyloxy, hexyloxy, heptyloxy, ocytyloxy, methoxybutyl, methoxybutoxy, methoxyhexyl, methoxyheptyl, and the like; and polyether chains, such as polyethylene oxide; perhaloalkyl, such as perfluoroalkyl, and the like.

More specifically, in embodiments of the present invention, the polythiophenes, which can be obtained from the monomer segment of Formula (III)

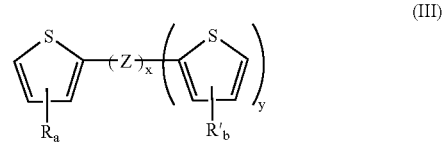

wherein R is alkyl, alkoxy, or derivatives thereof of, for example, from about 1, and more specifically, about 5 to about 25 carbon atoms; R' is hydrogen, halogen, alkyl, alkoxy, or the derivatives thereof of, for example, from about 1 to about 25 carbon atoms in length; a and b represent the number of substituents, and for example, are independently 1 or 2; Z is a divalent conjugated linkage that may also contain substituted and/or nonsubstituted 2,5-thienylene (or 2,5-thiophenediyl) moieties, and other aromatic units such as arylene, furandiyl, pyrrolediyl, pyridinediyl, benzofurandiyl, dibenzofurandiyl, benzothiophenediyl, dibenzothiophenediyl, carbazolediyl, and the like; and x and y represent the number of segments, such as for example, a number of from 0 to about 3.

The number average molecular weight ($M_n$) of the polythiophenes can be, for example, from about 2,000 to about 100,000, and more specifically, from about 4,000 to about 50,000, and the weight average molecular weight ($M_w$) thereof can be from about 4,000 to about 500,000, and more specifically, from about 5,000 to about 100,000 both as measured by gel permeation chromatography using polystyrene standards.

The polythiophene may be selected from the group consisting of Formulas (1) to (21) set forth below. In these formulas, n represents the number of segments and may be from about 10 to about 1,000.

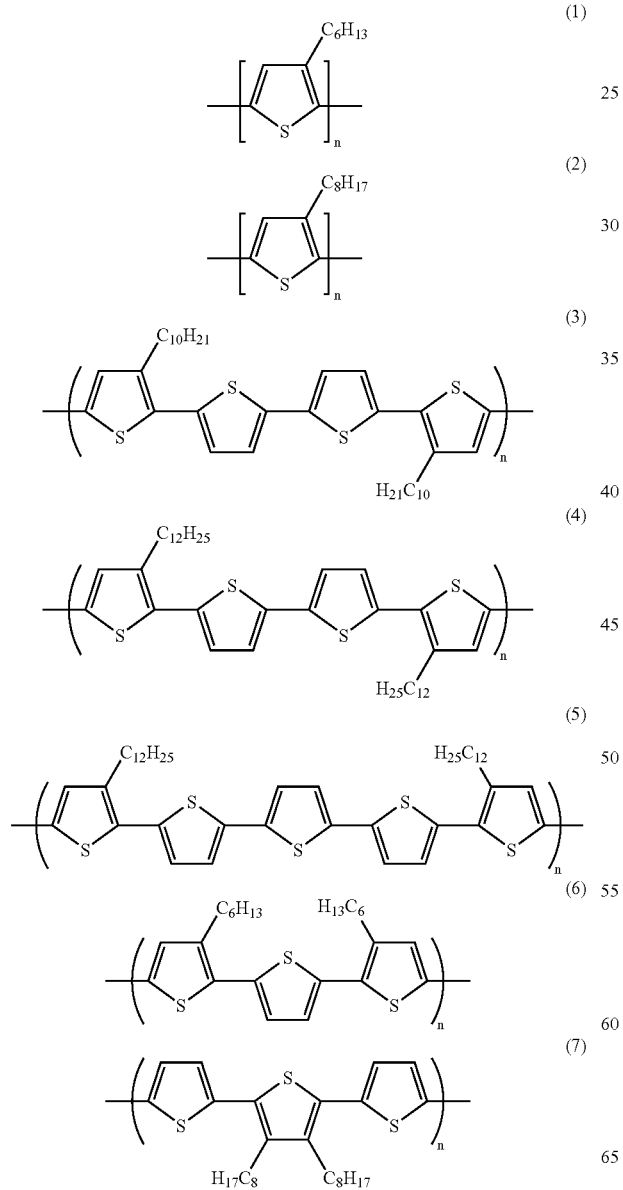

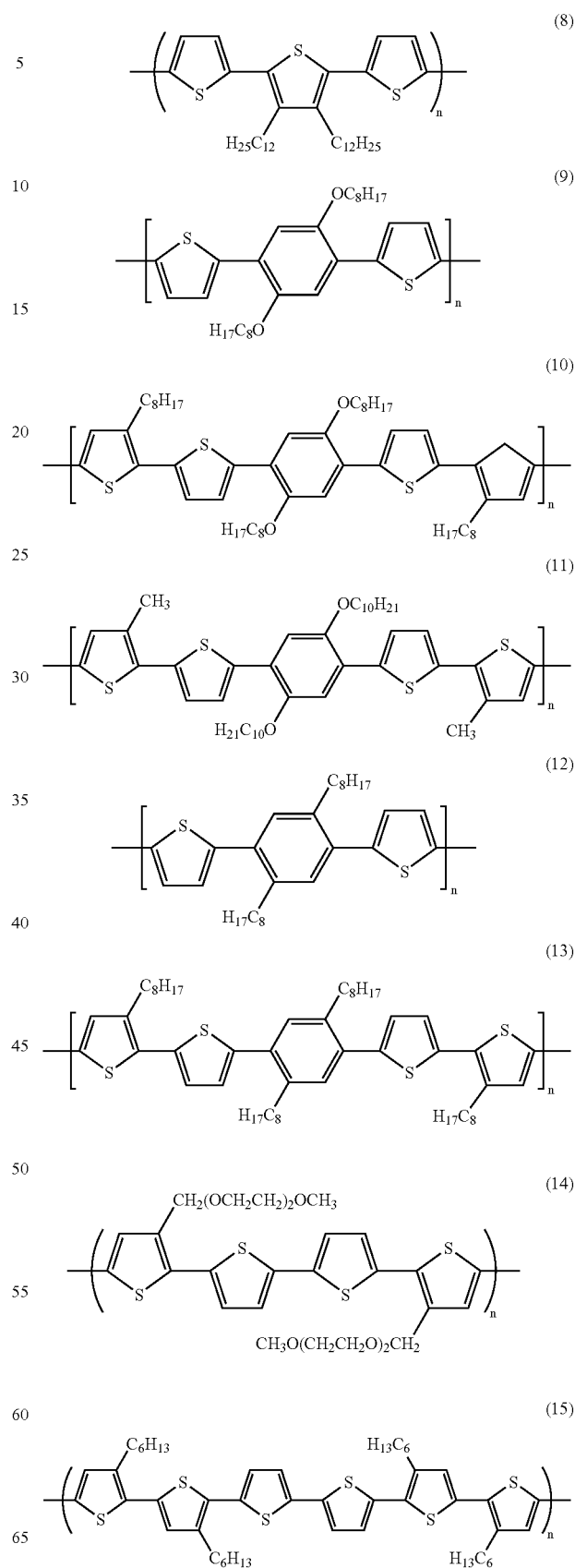

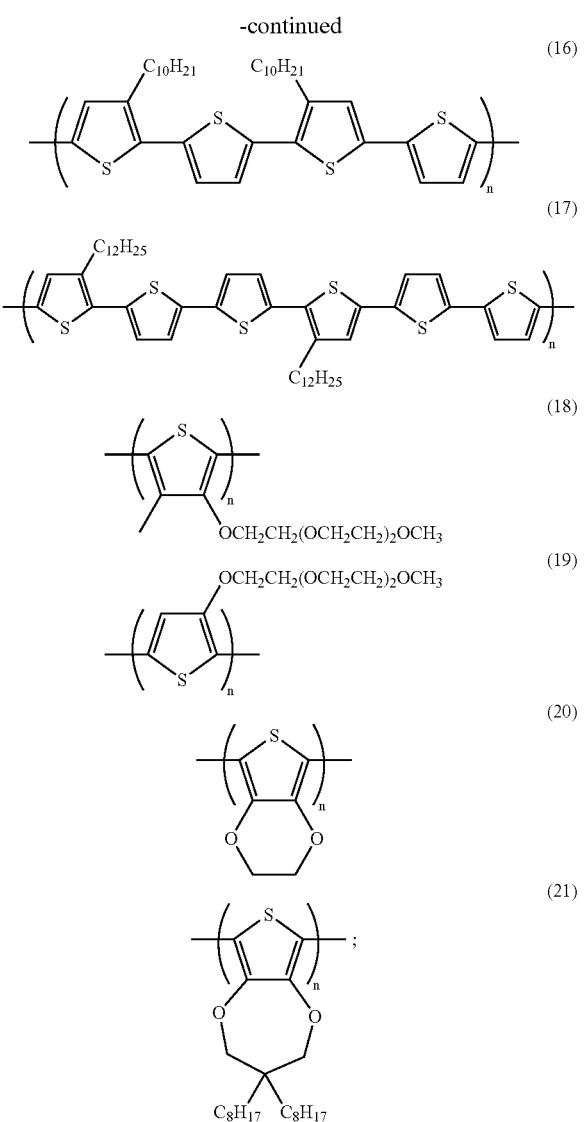

In a particularly preferred embodiment, the polythiophene has formula (4).

The polythiophene may be synthesized by any method. In embodiments, the polythiophene is synthesized by polymerizing polythiophene monomers and/or oligomers thereof in an organic solvent in the presence of metal halide, in particular, ferric chloride. In embodiments, the organic solvent is chlorobenzene.

Methods for forming polythiophene are further described in U.S. Publication No. 2004/0186265 A1, which is herein incorporated by reference in its entirety.

After the polythiophene is formed, it is mixed with water and an organic liquid at a temperature at which the organic liquid dissolves the polythiophene. Preferably, this temperature is maintained throughout the reaction at least until it is time to precipitate the polythiophene solid.

The organic liquid used during this mixing step may be the same liquid in which the polythiophene is formed. Alternatively, an different organic liquid may be used.

The organic liquid used during this mixing step must dissolve the polythiophene at least at an elevated temperature. For example, chlorobenzene can dissolve the polythiophene of formula (4) at temperatures above about 50° C. Thus, in embodiments, the organic liquid used during this mixing step is at least 50° C. Additional solvents that may be used in this step include 1,2-dichlorobenzene, 1,2-dichloroethane and toluene.

In embodiments, the composition is mixed by stirring for several minutes, preferably for about 10 to 20 minutes. An aqueous phase is then allowed to separate from an organic phase, and the organic phase is recovered. Water is then added to the organic phase and the composition is mixed at a temperature at which the organic liquid dissolves the polythiophene. The newly formed aqueous phase is then allowed to separate from the organic phase, and the organic is again recovered.

The steps of adding water, mixing, allowing the organic and aqueous phases to separate from one another and recovering the organic phase is referred to herein as a wash. This wash may be repeated more than one time. For example, this procedure can be repeated 7 times. It is generally repeated until the aqueous phase is clear and colorless.

In embodiments, a basic aqueous solution is then added to the organic phase. This basic aqueous phase may be a solution of ammonium hydroxide. However, other bases may also be used. Alternatively, or in addition, an acidic aqueous solution could be added if it would be helpful to remove impurities from the polythiophene. After adding a basic (or acidic) aqueous solution, the same procedure is utilized. In particular, an aqueous phase is allowed to separate from a organic phase and the organic phase is recovered. It is believed that, in embodiments, a basic (or acidic) wash may be helpful particularly in speeding up the purification process. However, a basic (or acid) wash is not required by the present disclosure.

After conducting a basic wash, additional washes using water are generally then conducted until the aqueous phase is clear, colorless and the pH is less than seven. This typically takes about four washes after the basic wash.

After conducting the final wash, the polythiophene solid is allowed to precipitate from the recovered organic phase. In embodiments, this is conducted by lowering the temperature of the solution to a temperature at which the organic liquid does not dissolve the polythiophene. In a preferred embodiment, the organic phase is added to another organic liquid from which polythiophene is easily precipitated. In a particularly preferred embodiment, that organic liquid is methanol. Another nonsolvent that may be used is acetone.

In embodiments, the organic liquid into which the polythiophene is dissolved for the wash steps is chlorobenzene. At a temperature at which chlorobenzene dissolves the polythiophene, the solution is orange colored. To precipitate the polythiophene, this orange colored solution may be added to methanol over about 15 to 20 minutes, which results in a purple slurry. The methanol may be at, for example, a temperature of from −30° C. to +50° C. In embodiments, the methanol is at room temperature. This purple slurry can then be filtered to recover polymer. After filtration, the resulting polymer can be washed with methanol one or more times. The separated product may then be heated in a vacuum at room temperature for about 24 to 48 hours to dry the polymer. The colors of these solutions make it easy to see these two phases.

Formation of a Di-alkyl Quaternary Thiophene

In a preferred embodiment, the polythiophene is a polymer of a quaternary thiophene having the following formula:

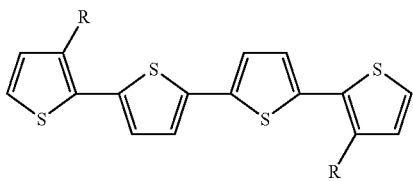

where R is a side-chain comprising, for example, alkyl, alkyl derivatives, alkoxy, and the like, such as alkoxalkyl, siloxalkly, perhaloalkyl, polyether, and the like. Each side-chain R, which may be the same or different, is preferably one that contains, for example, from about 5 to about 25 carbon atoms, and is preferably an alkyl having from 5 to 18 carbon atoms.

These quaternary thiophenes can be made by the following reaction scheme:

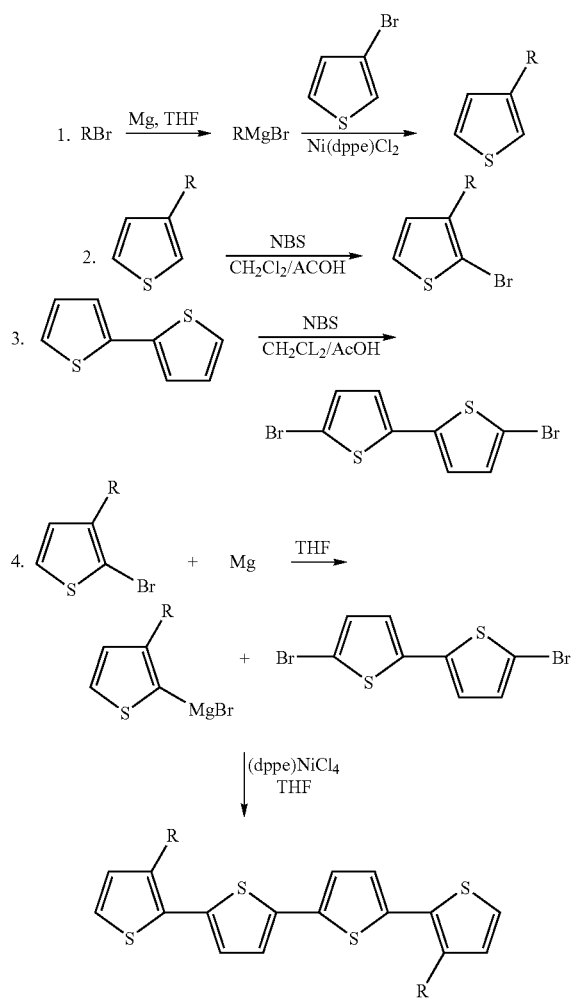

EXAMPLES

The following examples illustrate specific embodiments of the present invention. On skilled in the art would recognize that the appropriate reagents, component ratio/concentrations may be adjusted as necessary to achieve specific product characteristics. All parts and percentages are by weight unless otherwise indicated.

The polythiophene formed in each of the following examples is

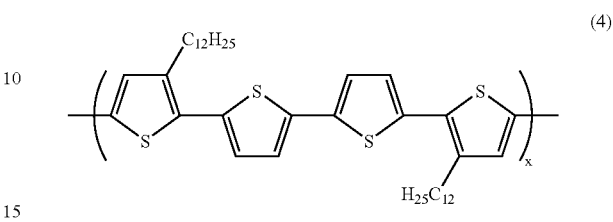

(4)

Thus, a starting material for the polymerization is the quaternary thiophene having the following formula:

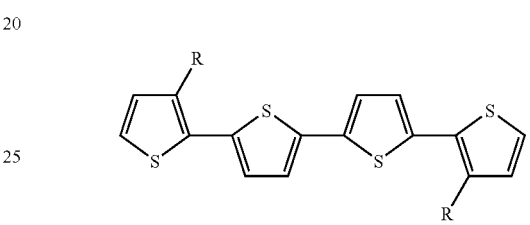

where R is $C_{12}H_{25}$.

Comparative Example 1

Synthesis: Charge 2.4 g of ferric chloride and 20 ml of chlorobenzene to a 250 ml 3 neck glass round bottom flask. Start a $N_2$ blanket and magnetic stirring. Make a solution of 2 g of the above-indicated quaternary thiophene and 60 ml of chlorobenzene. Add this solution to the flask over 5 minutes with an addition funnel. Using a heating mantle, heat the composition to 65° C. Maintain the 65° C. profile for 48 hours. After 48 hours, let the composition cool to room temperature.

Crude Polymer Work-Up: Charge reaction mixture to a 1 L separatory funnel along with 200 ml dichloromethane and 300 ml of deionized water (DIW). Shake well and let separate. Safely dispose of the acidic aqueous phase. Repeat the wash again with another 300 ml of DIW. Measure the pH of the filtrate and dispose. Repeat DIW wash a third time (filtrate should be almost colorless). If not, wash with water again. Prepare an aqueous solution of ammonium hydroxide by diluting 250 ml to 1 L with DIW. Use 400 ml of this aqueous $NH_4OH$ to wash the dichloromethane/polymer slurry. Let it sit to separate, then safely dispose of the basic waste. Wash 3 times with 300 ml DIW until filtrate is clear and colorless.

Polymer Recovery: Add 600 ml of methanol to a 2 L beaker with large 3 inch magnetic stir bar (or mechanical stirring). Start stirring then slowly add the polymer/dichloromethane slurry from the separatory funnel over about a half hour to obtain a purple slurry containing the crude polymer. Let this settle (might take overnight) then filter with a 5.5 cm buchner funnel and glass fiber filter paper to recover crude polymer. Dry at least 24 hours in a vacuum oven at a temperature of from 20° C. to 50° C. Typical yield is 90-92%.

In this procedure, the work-up uses dichloromethane/DIW at room temperature. The mixture is purple/black and has three phases making the separation hard to see. There is a dichloromethane phase at the bottom, with dark purple solids (poly quaternary thiophene (PQT) polymer) at the interface followed by the aqueous phase, which contains the ferric chloride to be removed. The polymer is almost insoluble in dichloromethane or DIW using this procedure. Separations can take an hour or more to develop before separation is possible, and since there is no dissolution of the polymer, washing occurs only at the surface and cannot easily get inside to remove impurities.

The recovered polymer is then purified. Purification is by soxhlet extraction at the 1 g scale. In the extraction, there is a 24 hour extraction with methanol, then a 48 hour extraction with heptane, and finally a 48 hour extraction with chlorobenzene to dissolve the soluble portion from the thimble into the flask, which is then precipitated with methanol and rinsed with methanol before drying in a room temperature vacuum oven. Purification yield is typically 80-90%. An overall yield (synthesis and purification) is typically 80%.

Comparative Example 2

Synthesis: Charge 6 g of ferric chloride and 50 ml of chlorobenzene to a 300 ml jacketed reaction flask. Start a $N_2$ blanket and stirring. Make a solution of 5 g of the above-indicated quaternary thiophene and 150 ml of chlorobenzene. Add this solution to the flask over 5 minutes with an addition funnel. Set jacket setpoint to about 66-67° C. so as to maintain a temperature of 65° C.±0.5° C. After 48 hours, let the composition cool to room temperature.

Crude Polymer Work-Up: Charge the reaction mixture to a 2 L separatory funnel along with 750 ml of dichloromethane and 750 ml of DIW. Shake well and let stand to separate. Repeat the wash again with another 750 ml of DIW. Repeat DIW wash 2 more times (filtrate should be almost colorless). Prepare an aqueous solution of ammonium hydroxide by diluting 50 ml to 1 L with DIW and use it to wash the dichloromethane/polymer slurry. Let it sit to separate. Wash 5 times with 750 ml DIW until filtrate is clear and colorless.

Polymer Recovery: Add 1500 ml of methanol to a 4 L beaker and stir with a large 3 inch magnetic stir bar. Slowly add the polymer/dichloromethane slurry from the separatory funnel over about 20 minutes to obtain a purple slurry containing the crude polymer. Filter with a 5.5 cm buchner funnel (and 1.5µ glass fiber filter paper) to recover crude polymer. Dry at least 24 hours in a vacuum oven at a temperature of from 20° C. to 50° C. 4.82 g of crude polymer was recovered at a 96.4% yield.

The recovered polymer is then purified as described in Comparative Example 1. The purification yield is 0.9 g or 90%. The overall yield is 86.7%.

Example 1

Synthesis: Charge 6 g of ferric chloride and 50 ml of chlorobenzene to a 300 ml glass jacket reactor. Start a $N_2$ blanket and stirring. Make a solution of 5 g of the above-indicated quaternary thiophene and 150 ml of chlorobenzene. Add this solution to the reactor over 5 minutes with an addition funnel. Set jacket setpoint to about 66-67° C. so as to maintain a temperature of 65° C.±0.5° C. Keep the temperature as close to 65° C. as possible by adjusting the setpoint as needed. Maintain the 65° C. profile for 48 hours. After 48 hours, let the composition cool to room temperature.

Crude Polymer Work-Up: Under $N_2$, charge the reaction mixture to a 1.5 L glass jacketed reactor with the jacket temperature set to 60° C. Add 500 ml of chlorobenzene and 500 ml of DIW, heating to 58° C. with stirring (mechanical). Hold at 58° C. for 10-20 minutes with good stirring (small vortex). Discharge to a 2 L separatory funnel, and let separate (about 5-10 minutes). Safely dispose of the acidic aqueous phase. Recharge the recovered organic phase to the reactor with 500 ml of DIW, stir for 10-20 minutes at 58° C. Discharge to a 2 L separatory funnel for separation of aqueous/organic phases. Repeat the 500 ml DIW washes a total of 7 or more times, until the filtrate is clear and colorless. Measure the pH of the filtrate and dispose. Prepare an aqueous solution of ammonium hydroxide by diluting 18.75 ml to 375 ml with DIW. Use this aqueous $NH_4OH$ to wash the chlorobenzene/polymer solution, heating to 58° C. and holding with stirring for only 5-10 minutes. Separate and safely dispose of the basic aqueous waste. Resume 500 ml DIW washes in the same manner as before checking the pH after each wash until the filtrate is clear, colorless and pH is less than 7. This typically takes 4 washes after the $NH_4OH$.

Polymer Recovery: Add 750 ml of methanol to a 2 L glass beaker with mechanical stirring. Charge the polymer/chlorobenzene to the reactor and heat to 58° C., then charge to a separatory funnel. Start stirring then slowly add the hot orange colored polymer/chlorobenzene solution, from the separatory funnel over about 15-20 minutes to obtain a purple slurry containing the crude polymer. Filter with a 5.5 cm buchner funnel (#30 glass fiber filter paper) to recover crude polymer. After filtration, wash on the filter three times with 100 ml of methanol followed by reslurry in 500 ml of methanol, then repeat. Dry 24-48 hours in a vacuum oven at a temperature of from 20° C. to 50° C. Yield was 4.24 g or 84.8%. No further purification was done.

Example 2

Synthesis: Charge 24 g of ferric chloride and 200 ml of chlorobenzene to a 1 L glass jacketed reactor. Start a $N_2$ blanket and stirring. Make a solution of 20 g of the above-indicated quaternary thiophene and 600 ml of chlorobenzene. Add this solution to the reactor over 5 minutes with an addition funnel. Set jacket setpoint to about 66-67° C. so as to maintain a temperature of 65 C±0.5 C. Keep the temperature as close to 65° C. as possible by adjusting the setpoint as needed. Maintain the 65° C. profile for 48 hours. After 48 hours, let the composition cool to room temperature.

Crude Polymer Work-Up: Charge reaction mixture to a 3 L glass jacketed reactor with heating set to 60° C. Add 1 L of chlorobenzene and 1 L of DIW, heating to 58° C. with mechanical stirring. Discharge the reaction mixture to a 4 L separatory tunnel, shake well and let separate for 5 minutes. Safely dispose of the acidic aqueous phase. Because of the equipment size available, the organic layer is split into 2 equal parts for the rest of the procedure. Recharge half of the recovered organic phase with 1 L of DIW to a 3 L glass jacketed reactor connected to a bath set at 60° C. and heat to 58° C. with stirring. Discharge to a 4 L separatory funnel for separation of aqueous/organic phases. Repeat the 1 L DIW washes until clear and colorless (typically 7 times total). Measure the pH of the filtrate and dispose. Prepare an aqueous solution of ammonium hydroxide by diluting 50 ml to 1 L with DIW. Use this aqueous $NH_4OH$ to wash the chlorobenzene/polymer solution. Safely dispose of the basic aqueous waste. Resume 1500 ml DIW washes checking the pH after each wash until the filtrate is clear, colorless and pH is 7±1. This typically takes 4 washes after the NH$_4$OH wash.

Polymer Recovery: Add 2.5 L of methanol to a 6-8 L pail with mechanical stirring. Start stirring then slowly add the polymer/chlorobenzene from the separatory funnel over about a half hour to obtain a purple slurry containing the crude polymer. Let this settle (or centrifuge) then filter with a 15 cm buchner funnel (#30 glass fiber filter paper) to recover crude polymer. After filtration, wash on the filter three times with 200 ml of methanol followed by reslurry in 1 L of methanol, then again wash on the filter with three times with 200 ml of methanol. Dry at least 24 to 48 hours in a vacuum oven at a temperature of from 20° C. to 50° C. Repeat with the second half. Yield is 18.18 g or 90.9% (typically 90-92%). No further purification was done.

Example 3

Synthesis: Charge 132 g of ferric chloride and 1100 ml of chlorobenzene to a 5 L glass jacketed reactor. Start a N$_2$ blanket and stirring. Make a solution of 110 g of the above-indicated quaternary thiophene and 3300 ml of chlorobenzene. Add this solution to the reactor over 5 minutes with an addition funnel. Set jacket setpoint to about 66-67° C. so as to maintain a temperature of 65 C±0.5 C. Keep the temperature as close to 65° C. as possible by adjusting the setpoint as needed. Maintain the 65° C. profile for 48 hours. After 48 hours, let the composition cool to room temperature.

Crude Polymer Work-Up: Because of the equipment size available, the composition is split into 4 equal parts for the rest of the procedure. Add 2 L of chlorobenzene and 1.5 L of DIW to one part of the composition, heating to 58° C. with mechanical stirring. Discharge the reaction mixture to a 6 L separatory funnel, shake well and let separate for 5 minutes. Safely dispose of the acidic aqueous phase. Recharge the recovered organic phase with 1.5 L of DIW to a 5 L glass jacketed reactor connected to a bath set at 60° C. and heat to 58° C. with stirring. Discharge to a 6 L separatory funnel for separation of aqueous/organic phases. Repeat the 1.5 L DIW washes until clear and colorless (typically 7 times total). Measure the pH of the filtrate and dispose. Prepare an aqueous solution of ammonium hydroxide by diluting 62.5 ml to 1.5 L with DIW. Use this aqueous NH$_4$OH to wash the chlorobenzene/polymer solution. Safely dispose of the basic aqueous waste. Resume 1500 ml DIW washes checking the pH after each wash until the filtrate is clear, colorless and pH is 7±1. This typically takes 4 washes after the NH$_4$OH wash.

Polymer Recovery: Reheat the organic phase under nitrogen to 58° C. in the 5 L reactor by setting the jacket temperature to 60° C. Add 3.1 L of methanol to a 10 L pail with mechanical stirring. Add the hot polymer/chlorobenzene solution to a separatory funnel maintaining the temperature above 50° C. Start mechanical stirring the methanol then slowly add the hot polymer/chlorobenzene from the separatory funnel over about 20 minutes to obtain a purple slurry containing the crude polymer. Let this settle (or centrifuge) then filter with an 18 cm buchner funnel (#30 glass fiber filter paper) to recover crude polymer. After filtration, wash on the filter three times with 200 ml of methanol followed by reslurry in 1 L of methanol, then again wash on the filter three times with 200 ml of methanol. Dry at least 24 to 48 hours in a vacuum oven at a temperature of from 20° C. to 50° C. Repeat with the second, third and forth quarters in a similar manner. Yield is 103.3 g or 93.9% (typically 90-92%). No further purification was done.

The following table summarizes the results of mobility testing.

| Example # | Crude mobility cm$^2$/V · s | Purified mobility cm$^2$/V · s | Comments |
|---|---|---|---|
| C1 | Not tested | 0.078-0.11 | 2 g scale, CH$_2$Cl$_2$/DIW |
| C2 | 0.04-0.06 | 0.049-0.059 | 5 g scale, CH$_2$Cl$_2$/DIW |
| E1 | 0.085-0.096 | not necessary | 5 g scale, heated chlorobenzene/DIW |
| E2 | 0.075-0.1 | not necessary | 20 g scale, heated chlorobenzene/DIW |
| E3 | 0.07-0.1 | not necessary | 110 g scale, heated chlorobenzene/DIW |

We see from this table that the mobility of comparative example 2 made by the dichloromethane work-up had low mobility. This mobility is typical of what we normally see using the dichloromethane procedure. The target mobility at this time is 0.1 cm$^2$/V.s. The experimental example 1, which used the same raw materials and procedure in the synthesis as in comparative example 2, but used the polymer dissolution work-up described herein, had a crude mobility almost twice as high at 0.085-0.096 cm$^2$/V.s as comparitive example 2. The crude mobility of example 1 was in fact better than in the purified comparative example 2. The experimental example 2 scaled-up the dissolution work-up 4 times to a 20 g scale. The mobility of this example at 0.075-0.1 cm$^2$/V.s was equal to the 5 g scale in experimental example 1 and also equal to the purified control in comparative example 1. In the last example (experimental example 3), the process was scaled up further to yield at least 100 g of crude polymer after work-up. The mobility of this sample was similar to the previous two experimental examples. Experimental examples 1, 2 and 3 therefore clearly demonstrate that crude polymer, that is, without further purification, with mobility equal to the purified control can be reproducibly made and scaled-up.

With the procedure described herein, complete dissolution of the polymer is achieved at 40-60° C. Washing with DIW at this temperature allows any water soluble impurities like ferric chloride to be dissolved and removed completely. Washing to neutrality insures than all water soluble ionic impurities are gone. Since it is believed that these are the main impurities leading to low mobility, their complete removal makes further purification unnecessary. A further benefit of the work-up is that the chlorobenzene/DIW extractions separate quickly and the interface is easy to see because the polymer in hot chlorobenzene is bright orange and the DIW is gray to clear depending on the amount of ferric chloride in solution. Furthermore, as of yet, no scaleable process for purification of PQT polymer has been demonstrated. Since the purification impediment is removed by the work-up procedure described herein, the process is commercial scale-up enabling.

The following benefits may be achieved by the procedure described herein: work-up of polymer is easier to see and separate; cost is substantially lowered because the purification by soxhlet is eliminated; and crude mobility is demonstrated to be equal to the purified mobility of the control sample.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for removing impurities from polythiophene, comprising:
   (a) mixing a composition comprising the polythiophene, water and an organic liquid at a temperature at which the organic liquid dissolves the polythiophene;
   (b) in the composition formed in (a), allowing an aqueous phase to separate from an organic phase and recovering organic phase;
   (c) adding water to recovered organic phase and mixing the resulting composition at a temperature at which the organic liquid dissolves the polythiophene;
   (d) in the composition formed in (c), allowing an aqueous phase to separate from an organic phase and recovering organic phase; and
   (e) allowing polythiophene solid to precipitate from recovered organic phase.

2. A method according to claim 1, further comprising separating the polythiophene solid from organic liquid by filtration and drying the filtered polythiophene solid.

3. A method according to claim 1, wherein said organic liquid is chlorobenzene.

4. A method according to claim 3, wherein said temperature at which the organic liquid dissolves the polythiophene is at least 50° C.

5. A method according to claim 1, wherein said polythiophene has the following formula:

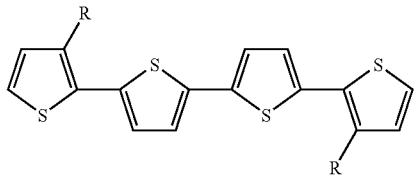

where each R, which may be the same or different, is an alkyl or substituted alkyl having from 1 to 25 carbon atoms.

6. A method according to claim 5, wherein said polythiophene is

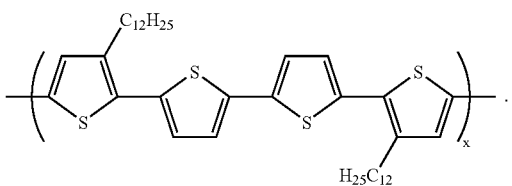

7. A method according to claim 1, wherein (c) and (d) are conducted more than one time.

8. A method according to claim 7, wherein, during at least one occurrence of (c), the water added to the organic phase contains a base.

9. A method according to claim 8, wherein the base is ammonium hydroxide.

10. A method according to claim 1, wherein the polythiophene solid is allowed to precipitate from recovered organic phase by lowering the temperature of the organic phase to a temperature at which the organic liquid does not dissolve the polythiophene.

11. A method according to claim 1, wherein the polythiophene solid is allowed to precipitate from recovered organic phase by mixing the recovered organic phase with a second organic liquid, such that the resulting composition does not dissolve the polythiophene.

12. A method according to claim 11, wherein said second organic liquid is methanol.

13. A method according to claim 3, wherein the polythiophene solid is allowed to precipitate from recovered organic phase by mixing the recovered organic phase, which is at a temperature of at least 50° C., with methanol.

14. A method according to claim 13, wherein said recovered organic phase is added to the methanol over about 15 to 20 minutes.

15. A method according to claim 13, wherein said methanol is at room temperature.

16. A method for removing impurities from polythiophene, comprising:
   (a) mixing a composition comprising the polythiophene, water and an organic liquid at a temperature at which the organic liquid dissolves the polythiophene;
   (b) in the composition formed in (a), allowing an aqueous phase to separate from an organic phase and recovering organic phase;
   (c) adding water to recovered organic phase and mixing the resulting composition at a temperature at which the organic liquid dissolves the polythiophene;
   (d) in the composition formed in (c), allowing an aqueous phase to separate from an organic phase and recovering organic phase;
   (e) using the organic phase recovered in (d), repeating (c) and (d) at least one time;
   (f) adding a basic aqueous solution to organic phase recovered in (e) and mixing the resulting composition at a temperature at which the organic liquid dissolves the polythiophene;
   (g) in the composition formed in (f), allowing an aqueous phase to separate from an organic phase and recovering organic phase;
   (h) using the organic phase recovered in (g), repeating (c) and (d) at least one time; and
   (i) allowing polythiophene solid to precipitate from organic phase recovered in (h).

17. A method according to claim 16, wherein said basic aqueous solution contains ammonium hydroxide.

18. A method for preparing polythiophene, comprising:
   (a) polymerizing thiophene monomer and/or an oligomer of thiophene monomer in an organic solvent in the presence of metal halide to form polythiophene;
   (b) mixing a composition comprising polythiophene formed in (a), water and an organic liquid at a temperature at which the organic liquid dissolves the polythiophene;
   (c) in the composition formed in (b), allowing an aqueous phase to separate from an organic phase and recovering organic phase;
   (d) adding water to recovered organic phase and mixing the resulting composition at a temperature at which the organic liquid dissolves the polythiophene;
   (e) in the composition formed in (d), allowing an aqueous phase to separate from an organic phase and recovering organic phase; and
   (f) allowing polythiophene solid to precipitate from recovered organic phase.

19. A method according to claim 18, wherein said metal halide is ferric chloride.

20. A method according to claim 18, wherein the organic solvent in (a) and the organic liquid in (b) are both chlorobenzene.

* * * * *